Sept. 26, 1967   P. J. GILINSON, JR., ET AL   3,343,405
VISCOMETER
Original Filed Feb. 28, 1962
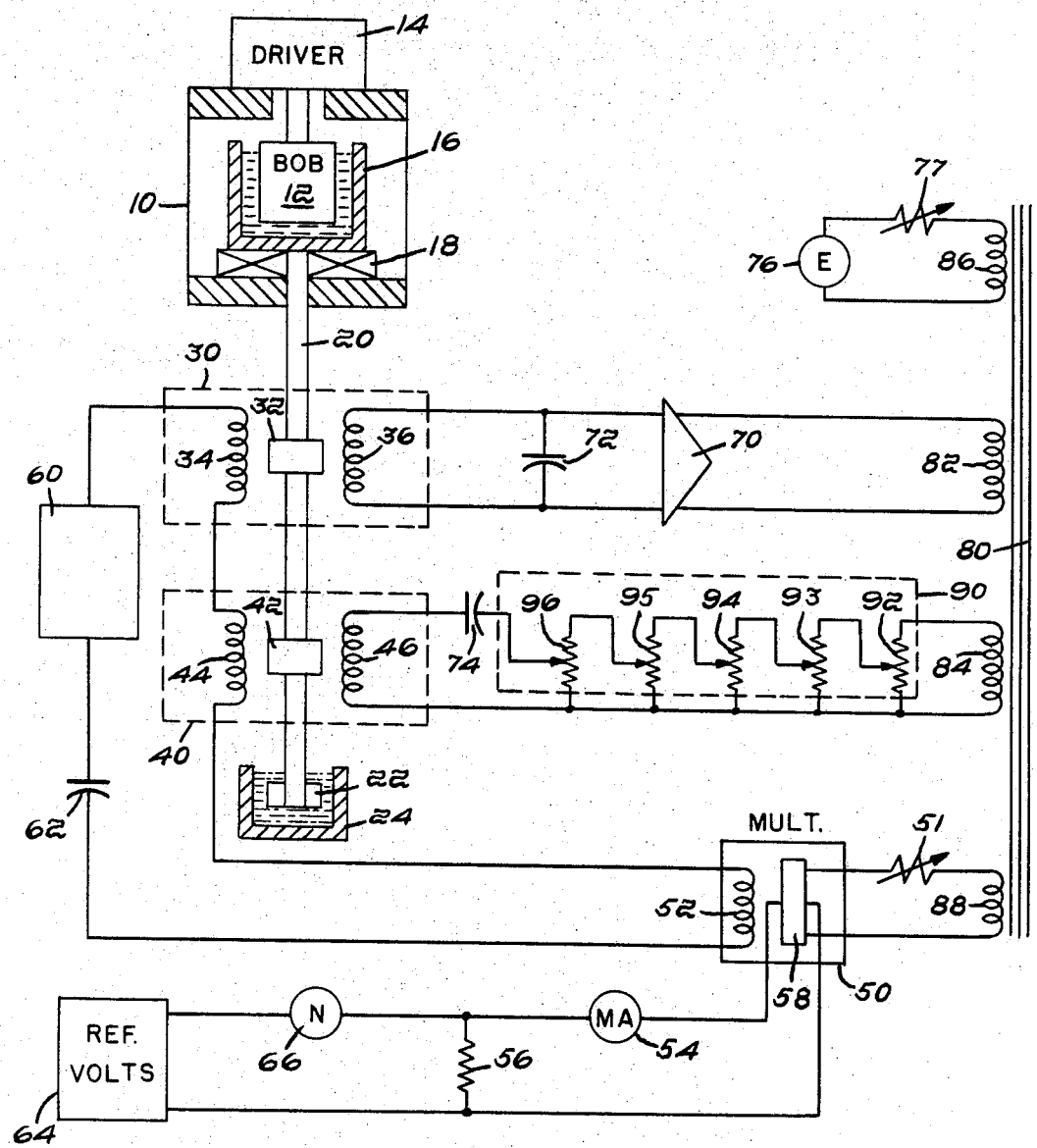

United States Patent Office 3,343,405
Patented Sept. 26, 1967

3,343,405
VISCOMETER
Philip J. Gilinson, Jr., 8 Fuller Road, Chelmsford, Mass. 01824; Charles R. Dauwalter, 56 Hinckley Road, Waban, Mass. 02168; and Edward W. Merrill, 56 Stone Road, Belmont, Mass. 02178
Continuation of abandoned application Ser. No. 176,261, Feb. 28, 1962. This application Jan. 27, 1965, Ser. No. 428,314
2 Claims. (Cl. 73—59)

ABSTRACT OF THE DISCLOSURE

A viscometer of the type in which one of two relatively rotatable elements is rotated and the other rotates in response to the viscous drag of a fluid in a space between them and drag measuring means includes first and second microsyns of which the first is a signal generator and the second is a torque generator.

---

This invention relates to viscosity measurement or the like and provides an improved instrument useful over a wide range of viscosity values, one especially effective in measuring low viscosity values at low shear rates and is a continuation of our co-pending application Ser. No. 176,-261, filed February 28, 1962, said application being now abandoned.

It has been customary to use a rotational viscometer for investigating the viscosity of fluids, especially non-Newtonian liquids. Such viscometers in general may take the form of a cylindrical cup with a coaxial cylindrical bob inside (couette type) or with a conical bob of large included angle arranged with its apex coaxial with the outside cylinder and almost contacting the flat bottom of the outside cylinder (cone and plate type). Other geometrical arrangements including features of the couette and the cone and plate geometrics, such as the coni-cylindrical type, may be employed. Measurements are made by filling the annular space between the bob and the cup with the fluid to be tested, and rotating either the bob or the cup with the coefficient of viscosity and the yield of value, if any, of the fluid being calculated from the corresponding values of the rotation and of the torque imposed by the viscous drag of the fluid which results. In fluids for which this instrument is especially suited, the viscosity will generally vary with the magnitude of the torque or the rotational speed and it is of prime importance to be able to detect such change of viscosity with high accuracy. In heretofore known instruments, the torque required to balance the rotation of the driven element has been measured in a variety of ways, including both mechanical and electrical means. However, all of such instruments have been deficient in one respect or another.

Accordingly, it is a major object of the present invention to provide a novel viscometer of the cup and bob type or the like having a torque measuring system capable of providing viscosity measurements of high accuracy over a wide range of values.

It is another object of the invention to provide a viscometer capable of measuring viscosity at extremely low shear rates, as may be necessary for viscosity measurements of non-Newtonian fluids of very low viscosity.

It is still another object of the invention to provide a viscometer, although sophisticated in concept and design, which is simple in its operation, and one which is readily adaptable to provide a control function, as well as an indicating function.

In general, the invention provides a cup and bob viscometer having two relatively rotatable elements and means for driving one of said elements, with said other element responding in torque to the viscosity of a fluid interposed between said two elements, together with torque responsive means having a closed loop torque-to-balance measuring system.

More specifically, a preferred system of the invention comprises primary and secondary excitation means providing a torque restoring force for the torque responsive viscometer element, with the primary excitation means being connected to a suitable power source providing a primary current flow or other quantity therethrough and the secondary excitation means having a feedback loop, with adjustable attenuator means and preferably an amplifier connected therein providing an unattenuated secondary current or other quantity for measurement and an attenuated secondary current or other quantity therein for torque balance. Such attenuator means is an especially important aspect of the invention, as it makes possible torque balance over many decades of torque values, with a constant measured secondary current value derived from an element displacement which may be maintained independent of torque, by setting a calibrated attenuator establishing a predetermined ratio between the unattenuated and the attenuated currents or other quantities to a predetermined meter reading for a direct reading of viscosity to several significant figures.

Another important aspect of the invention resides in multiplier means connected to said primary and secondary excitation means providing a mathematical current product or other quantity of said primary and secondary currents, said mathematical current product being proportional to said torque and hence proportional to the viscosity of said fluid under given conditions. Calibrated indicating or other means responsive to one or more of these currents may be and generally are provided for an indicating or control function, and may be utilized either independently or in conjunction with the attenuator means.

For the purpose of explaining further objects and features of the invention, reference is now made to the following detailed description thereof, together with the accompanying drawing wherein is shown in somewhat diagrammatic form a preferred embodiment of the viscometer of the invention.

In the drawing is shown a viscometer of the cup and bob type having a bob 12 driven by a driver motor 14 for rotation within a cup 16 containing the fluid the viscosity of which is to be measured. The cup 16 is also rotatably mounted by means of a suitable bearing 18, both the driver motor 14 and bearing 18 being mounted on a suitable support 10. It is important, especially for torque measurements of low value, that bearing 18 be of a low static friction type, such as an externally pressurized gas bearing having an uncertainty torque level of the order of at least as low as 0.001 dyne-centimeter.

Extending downwardly from cup 16 for rotational movement therewith is a shaft 20, preferably having at its lower end a suitable viscous damper consisting of a shaft mounted vane 22 submerged in fluid in a container 24. On shaft 20 are mounted the rotor elements 32 and 42 of identical variable reluctance electromagnetic devices, 30, 40, known to the art as Microsyn signal or torque generators, and which include primary coils 34, 44 and secondary coils 36, 46, see M.I.T. Instrumentation Laboratory Report E224, Microsyn Electromagnetic Components, R. K. Mueller, December 1952. These devices are used in the viscometer of the invention to perform one of two functions, as will be more completely explained later. Briefly, however, device 20 is used as a signal generator to develop an output alternating current carrier frequency voltage whose magnitude and polarity is directly proportional to the input angular deflection and direction of shaft 20 from a reference zero or null voltage position. Device 40 is used as a torque generator to develop an output torque proportional to the scalar product of the root-mean-squared values of the primary and secondary input currents of the device to counterbalance the torque applied to the shaft 20 by bob 12 through the fluid the viscosity of which is to be measured.

The primary coils 34, 44 of devices 30, 40 are connected together in series with one another and in series with the input coil 52 of multiplier or current product device 50. Preferably, capacitor 62 is also provided in said circuit to tune the circuit to series resonance with primary coils 34, 44, 52. These elements are connected to an alternating current power source 60 for providing an alternating primary excitation to said coils.

The secondary coils 36, 46, are connected to one another through amplifier 70, transformer 80 and attenuator 90, said transformer having windings 82, 84 for this purpose, to provide a closed secondary feedback loop circuit having secondary coil 36 as an input and secondary coil 46 as an output. Capacitor 72 is provided across coil 36 and the input to amplifier 70. It is tuned to parallel resonance with coil 36 such that the voltage at the input to amplifier 70 is in phase with the excitation current in primary coil 34. Capacitor 74 is provided in series with coil 46 and attenuator 90. Capacitor 74 is tuned to series resonance with secondary coil 46 such that the entire secondary circuit appears as a resistive load to transformer 80. Attenuator 90 is shown in the drawing as a series of voltage dividing potentiometers 92–96 of increasing resistance and is preferably of decade type for digital setting to a value known to several significant figures, as will later appear in more detail.

Transformer 80 is further provided with additional windings important to certain aspects of the invention. Thus winding 86 is provided as an input through adjustable resistor 77 for meter 76 as a direct indication of secondary current. Winding 88 is provided as an input through adjustable resistor 51 to multiplier 50, which provides an output proportional to the product of its two input currents. Such output may be measured directly, as by meter 54, or it may be used to establish an output voltage across resistor 56 which is compared with a reference voltage source 64 by nullmeter 66. Current product devices such as multiplier 50 suitable for use in the viscometer of the invention are known in the art, being of the type shown in Patent No. 2,838,232, for example, or of the Hall effect type, a solid state device of indium antimonide, such as is manufactured by Ohio Semiconductors division of Tecumseh Products Company. With such device a solid state element 58 is provided with input leads connected to winding 88 and with output leads connected to meters 54 and 66, and as well with a magnetic field input from coil 52.

According to the principles of the invention, and in accordance with the above described preferred embodiment thereof, the mathematical product of the primary current and the secondary current is proportional to the viscosity of the fluid in cup 16. Thus, if these currents or equivalent quantities be known, as is the case with the above described viscometer, a direct measurement of viscosity for indication or control may be provided, and such may be accomplished in a number of ways which will now be briefly described before going on to further aspects of the invention. For example, if the primary current be of a known, constant value, then the secondary current will be directly proportional to viscosity, at a given viscometer geometry and speed, and a suitable meter, such as meter 76 may be so calibrated. This apparently simple method of viscosity determination, although useful in some instances, is usually difficult of practical achievement, because of the practical difficulty of maintaining the primary current at a constant value. For this reason, it is much more satisfactory to use a current product device to perform a multiplication of unknown primary and secondary current values and so produce an output proportional to the viscosity of the fluid being measured. Such product output may itself be measured in a number of ways, such as by direct measurement with meter 54, bridge measurement with nullmeter 66, or the latter two in combination with a decade attenuator.

As to this last discussed point, it is first necessary to discuss the unique function of the attenuator 90 in the construction and operation of the viscometer of the invention, which attenuator makes possible its extraordinarily wide range of operation with high accuracy throughout. To do this, however, one must initially consider certain aspects of the operation of signal and torque generators 30, 40. Thus, in operation, shaft 20 will be displaced in rotation from its null position to provide across coil 36 a secondary voltage to amplifier 70 proportional to such displacement. Such displacement will have some maximum permissible value, at which value the secondary feedback loop must be adjusted to provide a balanced value of restoring torque by current flow through secondary coil 46. For accuracy, there is also a minimum displacement, below which "noise" seriously interferes with the then small current in the feedback loop. Within this range of displacement, omitting for the moment the effect of attenuator 90, it is possible to measure but a narrow range of viscosity values.

However, by the use of an attenuator to attenuate in a known manner the torque generating signal fed to the secondary coil 46, without at the same time attenuating the values of secondary current to be measured by meters 76 or 54, a number of unique and unexpected advantages result. Thus, the viscometer of the invention is capable of multi-range operation whereby the same level of unattenuated secondary current may be provided, although the secondary current feeding back into torque generator coil 46 may be attenuated to vary over many orders of magnitude. This is because at maximum permissible shaft displacement, there is provided a predetermined output from amplifier 70, which output is measured by meter 76, or, in terms of its product, with meter 54 or 66. The same or a proportional value of measured secondary current is also fed to attenuator 90 but its value is therein reduced by a ratio between its input and ouptut as is necessary to produce a torque which establishes said maximum permissible shaft displacement, for example. This makes it possible to operate the viscometer by adjusting an attenuator having known characteristics, such as a digital decade attenuator, at any value of viscosity to give a full scale value of secondary current as read by the meters, and then using the attenuator setting as a calibrated reading of viscosity. An attenuator 90 using five decades, potentiometers 92–96 is shown in the drawing for digital operation to five significant figures. Or, alternatively, the attenuator can simply be set to provide decade ranges, within which ranges the viscosity may be read by the calibrated meter 76 or 54.

However, the use of attenuator 90 provides other advantages as well. A particularly important advantage relates to the elastance or stiffness of the torque to balance closed loop, in that, for low torque, the elastance is low to provide automatic filtering of spurious torque variations, while at high torque values the elastance is high to provide rapid reading. Again, since the angular deflection of shaft 20 is constant for any full scale viscosity value, as is always the case when the viscosity value is read directly from the setting of attenuator 90, errors due to the angular position of shaft 20 are compensated.

With the general structure of the viscometer of the invention in mind, as well as certain of its principles as above discussed, its operation may now be explained in detail.

With power source 60 and amplifier 70 energized, driver motor 14 is operated to rotate bob 12 at any desired speed, which may be as low as one revolution every 5 to 10 minutes for measurement of viscosity at low shear rates as is frequently desirable with non-Newtonian liquids. Under these conditions, viscosity values corresponding to torque values as low as about 0.01 dyne-centimeters may be successfully measured. Or driver motor 14 may be operated to operate bob 12 at higher speeds as desired. With the driver motor 14 operating and with a fluid to be measured in cup 16, shaft 20 is angularly deflected, causing signal generator 30 to develop across coil 36 an output signal voltage proportional to the deflection angle of shaft 20. By reason of tuning capacitor 72, such output signal voltage is in phase with the excitation current in primary coil 34, in order that the secondary current into coil 46 be in phase with the primary excitation current. This signal is then amplified by amplifier 70 so that an output signal is provided from said amplifier proportional to the angle of deflection of shaft 20, and such output signal is greater than is necessary to provide the maximum balancing torque at the highest range of the viscometer. Such output signal is independent of the actual viscosity or torque values in the sense that, by means of attenuator 90, the actual balancing torque may be adjusted to known amounts of proportionality relatively to the amplifier output signal. Thus, for a given angular shaft deflection, say the maximum permissible deflection, the amplifier output signal will be of a predetermined value regardless of the actual viscosity or torque value. This amplifier output signal is fed, by means of transformer 80, without attenuation, to meter 76, multiplier 50 and to the input of attenuator 90, so that the measurements or indications provided, as by meters 76 or 54 are directly proportional to shaft deflection and may be so calibrated. But, except for the highest range, the amplifier output signal is attenuated as required to provide lower balance torques in the lower ranges.

The alternating current power source 60 provides the alternating primary excitation current to the signal and torque generators 30, 40, as well as the primary input to multiplier 50, although, with other types of systems, it is contemplated that a secondary loop alone might be utilized, without primary excitation as set forth above.

As stated above, the torque necessary to balance the input torque imposed on shaft 20 by the viscosity of the fluid being measured is proportional to the product of the in-phase components of the primary and secondary currents of the torque generator, and, assuming a constant primary current, possibly subject to error due to variations therein, is also proportional to the output of attenuator 90.

The current flowing through the secondary windings 86 and 88 and through meter 76 and the solid state element 58 of the multiplier 50, respectively, is proportional to the voltage at the amplifier output winding 82 of the feedback transformer 80. The voltage at winding 84 at the input to attenuator 90 is in turn proportional to the voltage at output winding 82. The attenuator output voltage is equal to the voltage at its input winding 84 multiplied by the attenuation factor of the attenuator 90. Thus, the secondary torque balance current in coil 46 is proportional to the measured secondary current times the attenuation factor. The output of the multiplier 50 as read on meter 54 is proportional to the product of the inphase components of its primary and secondary currents. Therefore the output as read on meter 54 is an accurate measure of the viscosity or torque to be measured, while that of meter 76 is subject to primary current variations.

In general, if the viscosity to be measured is extremely low, the respective torque generator secondary current will be proportionately extremely low. Under these circumstances, if the attenuator 90 is set to attenuate the voltage at attenuator input winding 84, then the voltage at windings 82, 84, 86, 88 will in effect be increased in proportion to the reciprocal of the attenuation factor in order to deliver the required low value of torque generator secondary current into the coil 46. This then increases the secondary input both to meter 76 and to the multiplier 50. Thus the output as read on meters 54 or 76 is increased in direct proportion to the reciprocal of the attenuation factor of the attenuator 90.

In the preferred embodiment of our invention, the attenuator 90 has five decades of attenuation, which may be considered as 1, 0.1, 0.01, 0.001 and 0.0001. Thus five decades of torque ranging from 1000 to 0.0 dyne-centimeters in the C.G.S. system of units can be measured on the identical scale of the direct current output meter 54 or 76. Each decade range is further subdivided to read to four significant figures, i.e., 987.5; 12.48; 5.852; and 0.1803. dyne-centimeters. Thus if the attenuation factors, 1, 0.1, 0.01, 0.001 and 0.0001 are each multiplied by the maximum viscosity value capability of our preferred example, in terms of torque, for example 1000 dyne-centimeters, the attenuator setting produces the full scale reading of the output meters 54 and 76 in viscosity or torque units, by establishing the ratio of its output to its input, i.e., 1, 0.1, etc.

Since the elastance of stiffness torque-angular deflection of the shaft 20 is proportional to the attenuation factor at high torque levels, when the factor approaches unity, the system is quite "stiff" and has a quick response time. Conversely, at low torque levels when the factor approaches zero, the system has less "stiffness" and a slower response time which is effective in damping out spurious torque variations which otherwise might produce inaccurate readings at low viscosity or torque values.

The variable resistors 51 and 77 are used to calibrate the viscometer of the invention such that the meters 54 and 76 will read viscosity or torque in a predetermined system of units. To calibrate a known torque is first applied, with the attenuator ratio or attenuation factor set at the value of said torque divided by the maximum capability (or torque). The resistors 51 and 77 are adjusted until the meters read full scale. This can be accurately set by means of the bridge null system provided and herein shown in conjunction with meter 54 although it can be applied as well to meter 76. To do this, the full scale current is made to flow through the resistor 56, the value of which is known accurately. The voltage drop in the resistor 56 is compared to a reference standard voltage from source 64 by means of a nullmeter 66. The reference voltage is chosen such that the full scale current through meter 54 develops a voltage across the resistor 56 equal to the reference voltage. Thus, when the nullmeter 66 reads zero, the output on meter 54 is exactly full scale. The viscometer is now calibrated.

With the viscometer so calibrated, it is preferably operated to measure viscosity by the use of calibrated, adjustable attenuator 90. For example, with the attenuator 90 first set on its highest range, the successively lower decade potentiometers 92–96 are adjusted to provide a full scale reading of multiplier output meter 54, at which time the viscosity reading is directly read to five significant figures by the settings of the five decade digital potentiometers 92–96. The meter 76 can also be used to provide the necessary full scale indication for setting attenuator 90, but with less accuracy. Thus, for any value of torque level, within the range of the viscometer, the attenuator reads the full scale value of viscosity or torque when the output from meters 54 and 76 reads full scale. Thus, in the bridge type of measurement, the attenuator is used as the potentiometric device to balance the full scale output against the known reference voltage.

Although the bridge method of measurement is preferred, because of its superior accuracy, the viscometer of the invention may also be used by setting attenuator 90 to the next higher range required for a full scale reading and then reading the significant figures from the calibrated meter 54, or, if the accuracy of the multiplier 50 is not needed, from calibrated meter 76.

Having described our invention in detail in accordance with patent statutes, various modifications and improve-

We claim:

1. In a viscometer having two relatively rotatable elements shaped, dimensioned, and disposed to provide an annular space between them for fluid the viscosity of which is to be measured, means for rotating one of said elements, the other element rotating in response to the viscous drag of the fluid in said space, electrically operated means comprising first and second microsyns whose rotors turn with said other element, said electrically operated means including a circuit for connecting the primaries of said microsyns to a power source and a circuit interconnecting the secondaries of the two microsyns as a closed feedback loop with the secondary of the first microsyn being the input, said first microsyn thus being a signal generator, and the secondary of the second microsyn being the output, the second microsyn thus being a torque generator, said closed feedback loop also including an amplifier, a pair of windings of a transformer, and an adjustable attenuator whereby angular displacement of the rotor of said first microsyn relative to its stator due to the viscous drag of said fluid results in torque being applied by the second microsyn to counterbalance said displacement in terms of an attenuated output derived from and in a predetermined ratio to an unattenuated and amplified input, both proportional to said angular displacement, a third transformer winding and electrically operated means including said third transformer winding to measure the countering force in terms of said amplified, unattenuated input.

2. In a viscometer having two relatively rotatable elements shaped, dimensioned, and disposed to provide an annular space between them for fluid the viscosity of which is to be measured, means for rotating one of said elements, the other element rotating in response to the viscous drag of the fluid in said space, electrically operated means comprising first and second microsyns whose rotors turn with said other element, said electrically operated means including a circuit connecting the primaries of said microsyns in series to a power source and including a coil of a multiplier, and a circuit interconnecting the secondaries of the two microsyns as a closed feedback loop with the secondary of the first microsyn being the input, said first microsyn thus being a signal generator, and the secondary of the second mycrosyn being the output, the second microsyn thus being a torque generator, said closed feedback loop also including an amplifier, a pair of windings of a transformer, and an adjustable attenuator whereby angular displacement of the rotor of said first microsyn relative to its stator due to the viscous drag of said fluid results in torque being applied by the second microsyn to counterbalance said displacement in terms of an attenuated output derived from and in a predetermined ratio to an unattenuated and amplified input, both proportional to said angular displacement, a third transformer winding connected to said multiplier, said multiplier providing a mathematical product output derived from the primary circuit and from the amplified unattenuated input which product is proportional to said torque and hence proportional to the viscosity of the fluid at a predetermined setting of said adjustable attenuator.

References Cited
UNITED STATES PATENTS

| | | | |
|---|---|---|---|
| 2,643,543 | 6/1953 | Herzog | 73—59 |
| 3,027,749 | 4/1962 | Barnard | 73—9 |

JAMES J. GILL, *Acting Primary Examiner.*

C. A. RUEHL, *Assistant Examiner.*